United States Patent [19]
Koppang et al.

[11] Patent Number: 5,759,022
[45] Date of Patent: Jun. 2, 1998

[54] METHOD AND SYSTEM FOR REDUCING $NO_x$ AND FUEL EMISSIONS IN A FURNACE

[75] Inventors: Richard R. Koppang, Monarch Beach; David K. Moyeda, Mission Viejo, both of Calif.

[73] Assignee: Gas Research Institute, Chicago, Ill.

[21] Appl. No.: 543,663

[22] Filed: Oct. 16, 1995

[51] Int. Cl.⁶ .................................................. F23D 14/00
[52] U.S. Cl. ........................... 431/5; 431/10; 110/345; 432/30; 432/161; 165/134.6
[58] Field of Search .................. 110/345, 348, 110/203, 210, 212, 214; 65/134.4, 134.6; 432/30, 54, 161, 209, 210, 180, 181; 431/5, 10

[56] References Cited

U.S. PATENT DOCUMENTS

| | | | |
|---|---|---|---|
| 4,347,072 | 8/1982 | Nagaoka et al. | 65/27 |
| 4,372,770 | 2/1983 | Krumwiede et al. | 65/27 |
| 4,599,100 | 7/1986 | Demarest, Jr. | 65/134.6 X |
| 4,739,713 | 4/1988 | Vier et al. | 110/345 X |
| 4,951,579 | 8/1990 | Bell | 110/214 X |
| 5,131,335 | 7/1992 | Spliethoff et al. | 110/214 X |
| 5,139,755 | 8/1992 | Seeker et al. | 423/235 |
| 5,203,859 | 4/1993 | Khinkis et al. | 432/30 |
| 5,238,396 | 8/1993 | Yap | 431/10 |
| 5,569,312 | 10/1996 | Quirk et al. | 110/214 X |

FOREIGN PATENT DOCUMENTS

0599548A1   6/1994   European Pat. Off. ........ C03B 5/235

OTHER PUBLICATIONS

Pulse Combustion:Impinging Jet Heat Transfer Enhancement *Combust. Sci. and Tech.*, 1993, pp. 147–165.

Measurement of the Optical Properties of Coal–Derived and Propane–Derived Soot in a Flat Flame Reactor; J. Rigby and B. Webb, Mech. Eng. Dept., Brigham Young Univ. and T. Fletcher, Chem. Eng. Dept., Brigham Y. U.

Heat Transfer Optimization in TV Glass Furnaces;pp. 141–151; W. J. Horan, Techneglas, Inc. and A.G. Slavejkov and L.L. Chang, Air Products and Chemicals, Inc.

Flue Gas Heat Recover in Glass Furnaces. Reprinted From *Glass*, Nov. 1983, P. Bony.

Thermal Performance of Cruciform Regenerator Packings, Reprinted From *Glass*, Mar., 1990, A. Zanoli, E.R. Begley, R. Videl and D. Lagarenne.

The Influence of the Thermal Properties of Refractories and Their Mode of Utilisation on the Heat Balance in Regenerators, Glass Technology, vol. 21, No. 4, Aug., 1980, J. Delrieux.

Primary Examiner—Henry A. Bennett
Assistant Examiner—Susanne C. Tinker
Attorney, Agent, or Firm—Thomas, Kayden, Horstemeyer & Risley LLP

[57] ABSTRACT

In a method of this invention, a first oxidant flow including oxygen and/or air, is injected into an exhaust gas flow from a primary burn zone in a furnace combustion chamber. The first oxidant flow is injected into the exhaust gas flow in a secondary burn zone downstream from the primary burn zone, but inside of the furnace chamber so that heat released from combustion of the first oxidant flow can be used for the purpose to which the furnace is applied. Also, the injection of the first oxidant flow into the secondary burn zone combusts fuel pollutants that might otherwise be released from the furnace into the atmosphere. The method can also include mixing a gaseous hydrocarbon fuel flow with the exhaust gas flow from the secondary burn zone to reduce the $NO_x$ level in the exhaust gas. Also, the method can include mixing a second oxidant flow including air and/or oxygen, with the exhaust gas, preferably after reducing the $NO_x$. If the furnace is a regenerative type, the air flow can be mixed with the exhaust gas flow in proximity to the entrance of a regenerator to heat the regenerator. The invention also includes a related system.

16 Claims, 8 Drawing Sheets

| STREAM | 1 | 2 | 3 | 4 | 5a | 5 | 6 | 7 |
|---|---|---|---|---|---|---|---|---|
| DESCRIPTION | Primary Air | Heated Primary Air | ←— | —— | Exhaust Gas | —— | —→ | Primary Fuel |
| T, °F | 60 | 2,410 | | | 3,010 | 903 | 853 | 60 |
| P, in WG (psig) | | 0.03 | 0.03 | | | -0.53 | -0.09 | |
| F, #/hr | 81,528 | 81,528 | 87,014 | 101,394 | 102,109 | 128,929 | 128,929 | 5,485 |
| F, scfm | 17,809 | 17,809 | 19,007 | 22,148 | 22,304 | 28,163 | 28,163 | 1,990 |
| NO, #/ton | 0 | 0 | | | | 2.10 | 2.10 | — |
| Q, MMBtu/hr | — | — | — | — | — | — | — | 107.45 |
| SR | — | — | 0.95 | 1.04 | 0.92 | 1.10 | — | — |

NOTES: OEAS with LOx, 50% O2 by vol.
Total NOx Control = 86%
Fuel Penalty from Baseline case = 7.97%
Net Pressure difference from Baseline case = -0.06 in WC

| 8 | 9a | 9b | 10 | 11 | 12 | 13 | 14 |
|---|---|---|---|---|---|---|---|
| Reburn Fuel | Primary HP O2 | Primary LP Air | Burnout HP O2 | Burnout LP Air | O2 | Leakage | Batch Volatiles |
| 60 | 60 | 60 | 60 | 60 | -297 | 60 | |
| 715 | 315 | 6,377 | 713 | 14,417 | 1,029 | 11,689 | 7.688 |
| 260 | 69 | 1,393 | 156 | 3,149 | 204 | 2,553 | |
| — | 0 | 0 | 0 | 0 | 0 | 0 | — |
| 14.02 | — | — | — | — | — | — | — |
| — | — | — | — | — | — | — | — |

FIG.3B

| STREAM | 1 | 2 | 3 | 4 | 5a | 5 | 6 | 7 |
|---|---|---|---|---|---|---|---|---|
| DESCRIPTION | Primary Air | Heated Primary Air | ←——————— Exhaust Gas ———————→ | | | | | Primary Fuel |
| T, °F | 60 | 2,360 | | | 2,960 | 1,203 | 1,003 | 60 |
| P, in WG (psig) | | 0.03 | 0.03 | | | -0.27 | 0.60 | |
| F, #/hr | 35,873 | 35,873 | 38,286 | 45,843 | 46,158 | 58,076 | 58,076 | 2,414 |
| F, scfm | 7,836 | 7,836 | 8,363 | 10,014 | 10,083 | 12,686 | 12,686 | 875 |
| NO, #/ton | 0 | — | | | | | | |
| Q, MMBtu/hr | — | — | | | | | | 47.28 |
| SR | — | — | 0.95 | 1.04 | 0.92 | 1.10 | 1.35 | — |

NOTES: OEAS with LOx, 50% O2 by vol.
Total NOx Control = 86%
Fuel Penalty from Baseline case = 7.97%
Net Pressure difference from Baseline case = 0.04 in WC

| 8 | 9a | 9b | 10 | 11 | 12 | 13 | 14 |
|---|---|---|---|---|---|---|---|
| Reburn Fuel | Primary HP O2 | Primary LP Air | Burnout HP O2 | Burnout LP Air | O2 | Leakage | Batch Volatiles |
| 60 | 60 | 60 | 60 | 60 | -297 | 60 | |
| | | | | | | | |
| 315 | 139 | 2,806 | 314 | 6,344 | 453 | 5,261 | 4,613 |
| 114 | 30 | 613 | 69 | 1,386 | 90 | 1,149 | |
| 0 | 0 | 0 | 0 | 0 | 0 | 0 | |
| 6.17 | — | — | — | — | — | — | — |

FIG. 4B

| STREAM | 1 | 2 | 3 | 4 | 5a | 5 | 6 | 7 |
|---|---|---|---|---|---|---|---|---|
| DESCRIPTION | Primary Air | Heated Primary Air | ←―― | ―― Exhaust Gas | ―― | ―― | ――→ | Primary Fuel |
| T, °F | 60 | 2,260 | | | 2,860 | 1,203 | 1,003 | 60 |
| P, in WG (psig) | | 0.03 | 0.03 | | | -0.29 | 0.63 | 1,982 |
| F, #/hr | 29,465 | 29,465 | 31,448 | 37,710 | 37,898 | 46,537 | 46,537 | 719 |
| F, scfm | 6,436 | 6,436 | 6,869 | 8,237 | 8,278 | 10,165 | 10,165 | |
| NO, #/ton | 0 | | | | | | | |
| Q, MMBtu/hr | | | | 1.04 | | 1.10 | 1.05 | 38.84 |
| SR | | | 0.95 | | 0.95 | | | ― |

NOTES: OEAS with LOx, 50% O2 by vol.
Total NOx Control = 86%
Fuel Penalty from Baseline case = 7.97%
Net Pressuer difference from Baseline case = 0.05 in WC

| 8 | 9a | 9b | 10 | 11 | 12 | 13 | 14 |
|---|---|---|---|---|---|---|---|
| Reburn Fuel | Primary HP O2 | Primary LP Air | Burnout HP O2 | Burnout LP Air | O2 | Leakage | Batch Volatiles |
| 60 | 60 | 60 | 60 | 60 | -297 | 60 | |
| 188 | 114 | 2,305 | 208 | 4,205 | 322 | 4,226 | |
| 68 | 25 | 503 | 45 | 919 | 64 | 923 | 3,844 |
| 0 | 0 | 0 | 0 | 0 | 0 | 0 | |
| 3.68 | | | | | | | |
| ― | ― | ― | ― | ― | ― | ― | |

METHOD AND SYSTEM FOR REDUCING NO$_x$ AND FUEL EMISSIONS IN A FURNACE

BACKGROUND OF THE INVENTION

1. Field of the Invention

This invention is directed to apparatuses, systems and methods for reducing the emission of NO$_x$, and combustible fuel in the exhaust from furnaces such as boilers, heaters, incinerators and kilns and the like, that operate at relatively high temperatures.

2. Description of the Related Art

'Acid rain' is a major problem in some areas of the world in which industrial emissions, generally from burning hydrocarbon fuels, react with gases in the atmosphere to produce acidic compounds which fall as rain and alter pH levels in the environment. The impact of acid rain can be observed in rural areas as the destruction of vast tracts of trees, and also in urban areas in which acid rain corrodes metal and concrete structures such as buildings. Acid rain has a significant impact on the world ecosystem, and causes the destruction of large amounts of natural resources and manmade structures every year.

Another recognized air-pollutant is unburned combustible gases that are emitted from furnaces, boilers, incinerators and the like. Such combustible gases have been identified as an important contributor to the degradation of air-quality in many, particularly urban, regions of the world.

NO$_x$ has been identified as an emission product that is one of the chief sources of acid rain. Generally, NO$_x$ is generated by the combustion of hydrocarbon fuel to produce the relatively high temperatures required in steel mills, power plants, petroleum refineries, metal smelters and glass furnaces. Several systems and techniques have been proposed to reduce the emission of NO$_x$ in such industries. For example, European Patent Application 0 599 548 A1 of Richard Quirk et al. published Jun. 1, 1994 (hereinafter, the "Quirk et al. application") proposes a method of operating a cross-fired regenerative glass furnace to purportedly minimize NO$_x$ emissions from the furnace. The Quirk et al. application proposes a first method in which combustible material in excess of that required for stoichiometric combustion is supplied to and combusted in the furnace. The combustible materials in the exhaust gases from the furnace flow through a regenerator and are reacted with sufficient air to reduce the level of NO$_x$ and combustible material in the exhaust gas from the furnace. In a second method of the Quirk et al. application, the conditions in the melting furnace are operated stoichiometrically and fuel is supplied to the exhaust gases, either through burners situated in the outlet port mouth region or by preextising burners, as they leave the melting area and enter the regenerator furnace. Air is added to the exhaust gases as they leave the regenerator to combust and thus remove combustible material in the waste gas before exiting to atmosphere.

Although the methods of the Quirk et al. application are meritorious to an extent in reducing NO$_x$ and combustible material levels in the exhaust gas from a glass furnace, further reduction in the amount of furnace exhaust NO$_x$ and combustible material levels below those attainable with the methods of the Quirk at al. application would be desirable. Also, it would be desirable to reduce the relatively significant fuel penalty required by the methods of the Quirk et al. application.

U.S. Pat. No. 5,203,859 issued Apr. 20, 1993 to Khinkis et al., discloses a method and apparatus for reducing NO$_x$ emissions from an industrial furnace. An aspirator draws air from an inlet of a regenerator to deplete the amount of oxidant flowing into the furnace, and the heated air is mixed with oxygen in an ejector and injected into the furnace chamber downstream of its primary flame. In U.S. Pat. No. 5,203,859, the depletion of the oxidant in the primary air flow to the furnace reduces NO$_x$ emissions from the furnace, and the injection of the oxygen/air mixture into the furnace chamber downstream of the primary flame combusts fuel in the exhaust from the primary flame. However, it would be desirable to lower the NO$_x$ and combustible fuel levels below those attainable with the method and apparatus of U.S. Pat. No. 5,203,859.

SUMMARY OF THE INVENTION

This invention overcomes the disadvantages of the prior art noted above. According to a method of this invention, a first air flow is heated, and mixed with a first flow of hydrocarbon fuel, to produce a flow of a fuel-rich mixture having a stoichiometric ratio of oxidizer to fuel less than that required for stoichiometric combustion. The fuel-rich mixture is combusted in a first, primary burn zone of a furnace combustion chamber, to generate heat used, for example, to melt glass or steel, or to heat steam used to drive turbines in a power generator plant. The combustion of the fuel-rich mixture results in an exhaust gas flow that flows from the first zone of the chamber to a second burn zone of the chamber. A second air flow and optionally a first oxygen flow are mixed to produce a first oxidant flow that is injected into the exhaust gas flow in the second zone of the chamber, to combust fuel in the exhaust gas flow and thus generate additional heat that can be applied to the particular purpose for which the furnace is used.

To reduce NO$_x$ in the exhaust gas flow from the chamber, a second flow of hydrocarbon fuel is mixed at a sufficiently high temperature with the exhaust gas to produce a reduction reaction to lower the amount of NO$_x$ in the exhaust gas flow. For example, the second flow of hydrocarbon fuel can be mixed at a sufficiently high temperature with the exhaust gas flow at an outlet port of the chamber. A second oxidant flow is mixed with the exhaust gas flow from the chamber, to combust fuel in the exhaust gas flow that is subsequently emitted to atmosphere. The second oxidant flow can be an air flow, or can be an air flow mixed with a second oxygen flow. For example, the second oxidant flow can be mixed with the exhaust gas flow at an entrance to a regenerator if the furnace is a regenerative variety. In this case, the heat of the exhaust gas flow, including the heat generated by the combustion of the second oxidant flow with fuel in the exhaust gas flow, can be used to transfer heat to the regenerator for use in heating the first air flow.

Advantageously, due to the reduction of the amount of NO$_x$ produced in the exhaust gas flow from the furnace by combusting a fuel-rich mixture therein, the second hydrocarbon fuel flow is reduced relative to prior art methods. Accordingly, the fuel-consumption of the method of this invention is reduced relative to the prior art. Also, the fuel-rich mixture combusted in the furnace chamber and the second flow of hydrocarbon fuel do not result in the emission of appreciable combustible fuel because the second oxidant flow combusts this fuel before the exhaust gas is emitted to the atmosphere.

The invention also includes a system for use with a furnace having a combustion chamber with primary and secondary burn zones. In the primary zone, hydrocarbon fuel is combusted to generate heat. The combustion of the fuel in the primary burn zone produces an exhaust gas that flows from the primary burn zone to the secondary burn zone. The system includes at least one ejector with two inlets for receiving oxygen and air, respectively. The ejector also has an outlet coupled to the chamber and communicating with the secondary burn zone. The ejector mixes the oxygen and air to produce an oxygen-enriched air mixture, and injects the oxygen-enriched air mixture into the secondary burn zone of the chamber to combust fuel in the exhaust gas and generate heat in the chamber. Alternatively, the ejector can be omitted from the system of this invention by coupling pipes receiving respective flows from respective oxygen and air supplies, to a common pipe that injects the oxygen-enriched air mixture into the secondary burn zone under pressure of the oxygen and air flows, to combust fuel in the exhaust gas and generate heat in the chamber. The system can also include a pump or compressor coupled between an outlet port from the chamber and a hydrocarbon fuel supply. The pump or compressor forces hydrocarbon fuel into the outlet port to produce a reduction reaction to lower the amount of $NO_x$ in the exhaust gas. The system can also include a fan having an inlet to receive ambient air, and an outlet coupled to an entrance of a regenerator. The fan drives ambient air into the entrance to the regenerator to combust fuel in the exhaust gas. Alternatively, the fan can drive ambient air to be mixed with oxygen in the entrance to the regenerator, to combust fuel in the exhaust gas. As a further alternative, an ejector can replace the fan. The ejector can be coupled to receive a pressurized oxygen flow that causes the ejector to draw in an air flow for mixing with the oxygen flow in the ejector. The pressurization of the oxygen flow provides the motive force to inject the air/oxygen mixture into the entrance to the regenerator.

The above-described objects and advantages, together with others that will become subsequently apparent, reside in the details of construction and operation as more fully hereinafter described and claimed, reference being had to the accompanying drawings, forming a part hereof, wherein like numerals refer to like parts throughout.

BRIEF DESCRIPTION OF THE DRAWINGS

The present invention can be better understood with reference to the following drawings. The drawings are not necessarily to scale, emphasis instead being placed upon clearly illustrating principles of the present invention.

FIG. 3B is a table of the conditions of fluid flows in respective indicated regions of the system of FIG. 3A;

FIG. 4B is a table of the conditions of flows or streams in respective indicated regions of the system of FIG. 4A;

FIG. 5B is a table of the conditions of flows or streams in respective indicated regions in the system of FIG. 5A.

DESCRIPTION OF THE PREFERRED EMBODIMENTS

Figure 1:
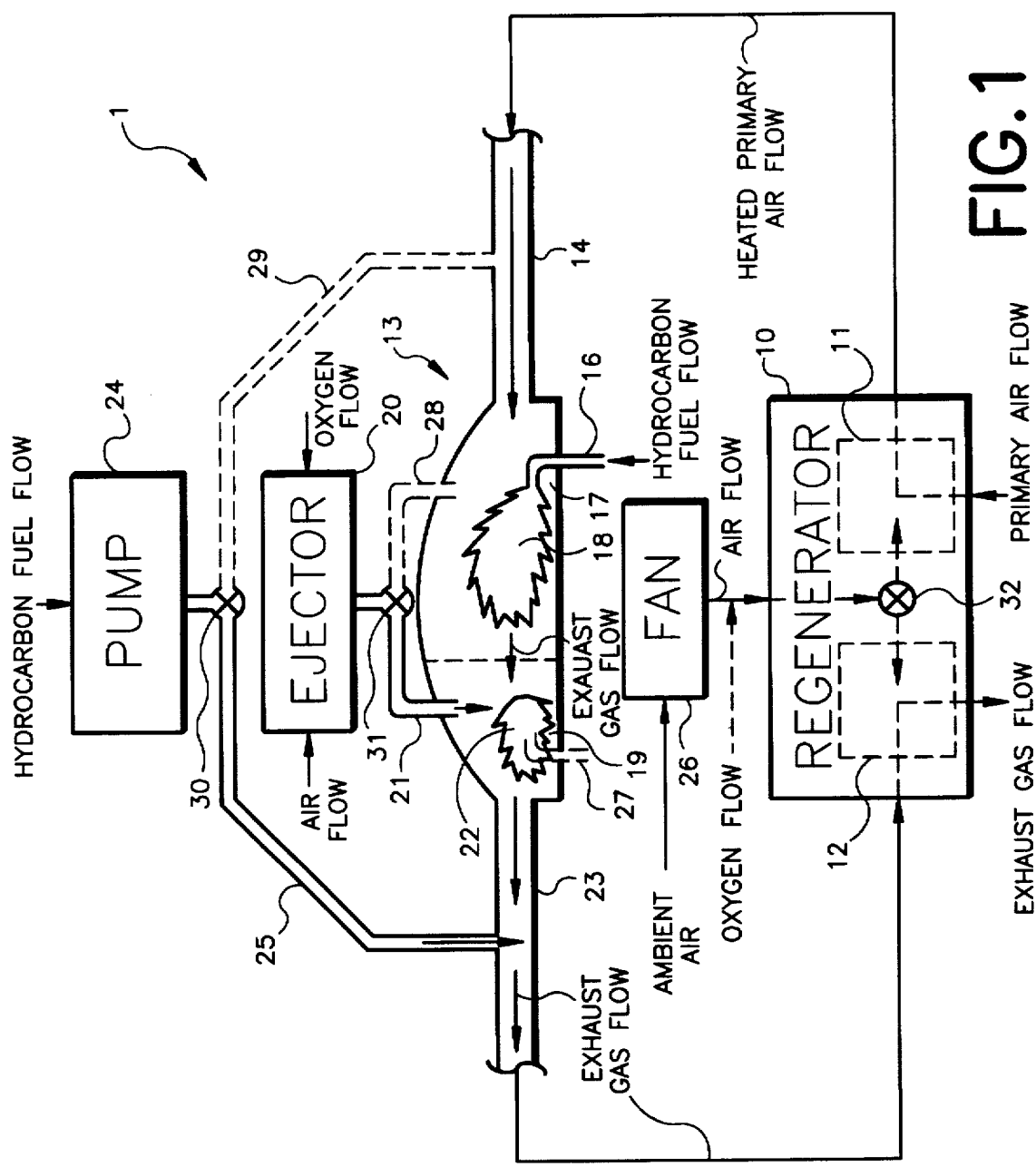
FIG. 1 is a diagram of a system and method in accordance with the invention.

In FIG. 1, a system 1 in accordance with this invention is shown. In FIG. 1, the system 1 is applied to a regenerative-type furnace used, for example, to melt glass. However, it should be appreciated that the invention can as well be applied to other types of high-temperature furnaces such as smelters, incinerators, boilers, heaters, kilns or the like.

In FIG. 1, a primary air flow moves through a regenerator 10 that heats the primary air flow. The primary air flow can be ambient air driven through ducting by a fan (not shown), for example. As shown in broken lines in FIG. 1, the regenerator 10 can be of a type that includes first and second regenerator units 11, 12 through which the flow of primary air into, and the flow of exhaust gas from, furnace 13 is alternated between first and second operational modes from time to time (typically in intervals from fifteen to twenty minutes). In the first operational mode, the first regenerator unit 11 receives and heats the primary air flow while the second regenerator 12 receives and is heated by the exhaust gas flow from the furnace 13. In the second operational mode, the second regenerator unit 12 receives and heats the primary air flow as the first regenerator unit 11 receives and is heated by the exhaust gas flow from the furnace 13. In the typical regenerative furnace, the primary air flow can be heated to two thousand degrees Farenheit or more.

From the regenerator 10, the heated primary air flow is channeled by an inlet port 14 into combustion chamber 15 of the furnace 13. In addition to the heated primary air flow, the furnace 13 is coupled to receive a hydrocarbon fuel flow such as natural gas through a burner 16. The hydrocarbon fuel flow can be generated by a pump or compressor (not shown) that drives the hydrocarbon fuel through piping (not shown) from a fuel supply to the burner 16 and into the furnace 13. Hereinafter, the term 'pump' will be used to include both liquid-fuel pumps and vapor-fuel compressors. The hydrocarbon fuel flow and the heated primary air flow are mixed in a first, primary burn zone 17 of the combustion chamber 15. Importantly, the hydrocarbon fuel flow and the heated primary air flow should be mixed in the primary burn zone in a proportion that produces a fuel-rich mixture, for example, with a stoichiometric ratio of oxidizer to fuel in a range from 0.95 to 0.99. The fuel-rich mixture with a stoichiometric ratio in a range from 0.95 to 0.99 is not so fuel-rich that it will attack certain common types of refractories used in furnaces, a significant advantage of this invention relative to the prior art. The fuel-rich mixture is combusted in the primary burn zone 17 thus generating a primary flame 18. The combustion of the fuel-rich mixture in the primary burn zone 17 generates heat used for the purpose for which the furnace 13 is applied, for example, to melt glass if the furnace 13 is a glass furnace, or to heat and/or generate steam supplied to a turbine in a power plant. The combustion of the fuel-rich mixture in the primary burn zone 17 also produces exhaust gas that flows from the primary burn zone 17 into a secondary burn zone 19 of the combustion chamber 13. For example, the primary burn zone 17 can include a volume of roughly two-thirds of the combustion chamber 15, and the secondary burn zone 19 can include about one-third of the volume of the chamber 15. Essentially, the primary burn zone 17 is that portion of the furnace 13 in which the primary flame 18 exists, and the secondary burn zone 19 is considered as that portion of the furnace 13 downstream of (relative to the flow of the exhaust gas) and not including the primary flame 18.

An ejector 20 has two inlets coupled to receive an air flow and an oxygen flow, respectively. The air flow can be introduced into the ejector 20 from the atmosphere, and the oxygen flow can be from a pressurized source and/or driven into the ejector 20 with a pump (not shown in FIG. 1), via piping. In the ejector 20, the air and oxygen flows are mixed to produce a first oxidant flow that is injected into the secondary burn zone 19 of the combustion chamber 15, and hence also into the exhaust gas flow from the primary burn zone 17, through an outlet pipe 21 coupled between the ejector 20 and the furnace 13. To inject the first oxidant flow into the secondary burn zone 19, the outlet pipe 21 has an outlet end communicating with the secondary burn zone 19. The motive force for injecting the first oxidant flow into the secondary burn zone 19 can be provided by the oxygen flow into the ejector 20 if the oxygen flow is sufficiently pressurized. Alternatively, the ejector 20 can be omitted and the oxygen and air flows can be coupled through respective pipes to the pipe 21 that would in this case be common to both of the pipes receiving respective oxygen and air flows. Preferably, the injection of the first oxidant flow into the exhaust gas flow is performed in a proportion to produce an oxidizer-rich mixture with a stoichiometric ratio of about 1.04. The injection of the first oxidant flow into the secondary burn zone 19 combusts fuel remaining in the exhaust flow from the primary burn zone 17 and generates a secondary flame 22. The combustion of this fuel in the secondary burn zone 19 not only reduces the emission of fuel pollutants from the furnace 13, but also generates heat inside of the combustion chamber 15 where such heat can be used for the purpose to which the furnace is applied. Importantly, relatively little oxygen, or only compressed air, is required for the first oxidant flow to combust the fuel in the exhaust gas flow from the furnace 13 because the furnace 13 is operated at near stoichiometric conditions, and any fuel that does remain in the exhaust gas flow can be combusted with a second oxidant flow (often called "overfire air") before the exhaust gas is emitted to the atmosphere as will be described later in this document.

Figure 2:
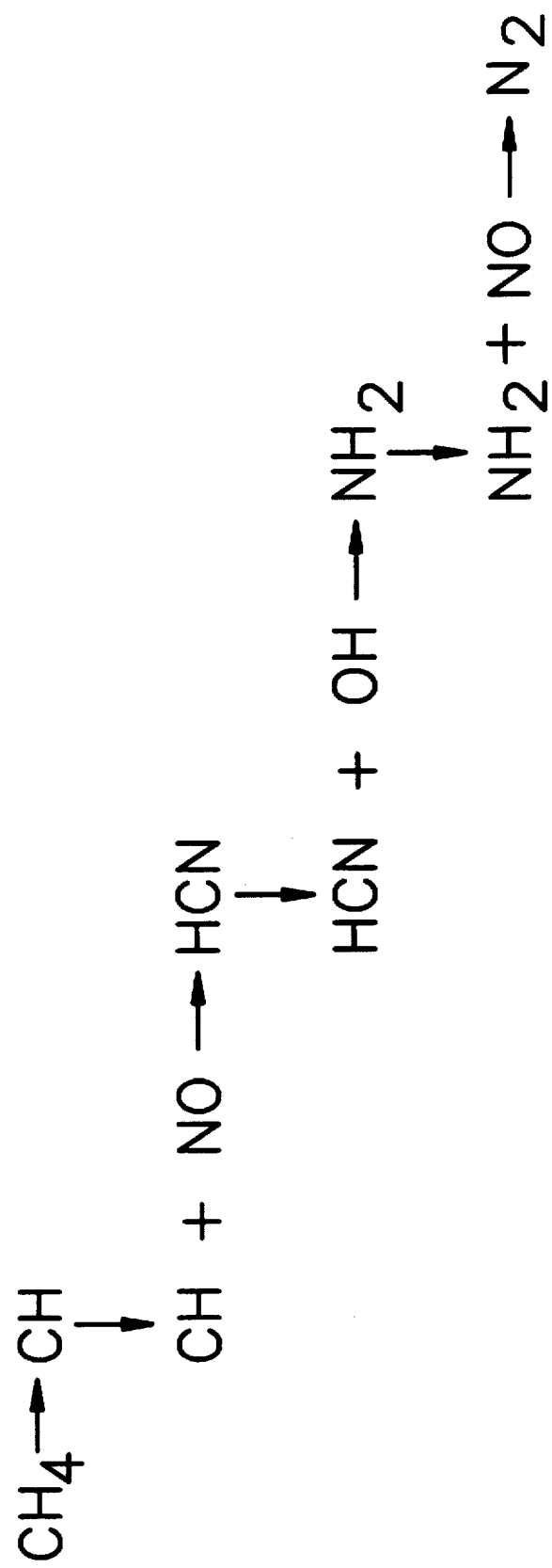
FIG. 2 is a diagram of a reduction reaction for reducing $NO_x$ in exhaust gas used in the system and method of this invention.

From the secondary burn zone 19, the exhaust gas flow exits the combustion chamber 15 through an outlet port 23. Although the burning of a fuel-rich mixture in the primary burn zone 17 of the furnace 13 helps to reduce the formation of $NO_x$, the exhaust gas flow from the furnace 13 flowing in the outlet pipe 23 nonetheless has appreciable levels of $NO_x$ due to the relatively high temperatures generated in the furnace 13. To lower the $NO_x$ amount in the exhaust gas flow, a hydrocarbon fuel flow is mixed with the exhaust gas flow in the outlet port 23 to cause a reduction reaction as shown in FIG. 2. Specifically, methane ($CH_4$) in the gaseous hydrocarbon fuel breaks down in the heat of the exhaust gas to hydrocarbon fragments (CH) which react with NO to produce intermediate species (HCN). The intermediate species (HCN) reacts with an OH group to generate $NH_2$. The $NH_2$ further reacts with NO to generate molecular nitrogen ($N_2$).

To mix the hydrocarbon fuel (or any other type of fossil fuel) flow with the exhaust gas flow in the outlet port 23, a pump (or compressor) 24 can be used. The pump 24 has an inlet coupled to receive hydrocarbon fuel from a fuel supply (not shown) via piping, for example. The pump 24 forces the hydrocarbon fuel to flow into an outlet pipe 25 coupled between the pump 24 and the outlet port 23. The hydrocarbon fuel flow exits the pipe 25 and mixes with the exhaust gas flow in the outlet pipe 23. The hydrocarbon fuel flow and the exhaust gas flow are preferably mixed in the outlet pipe 23 in a proportion to produce a fuel-rich mixture with a stoichiometric ratio of approximately 0.92 and at a temperature greater than 2200 degrees Farhenheit.

From the outlet port 23, the exhaust gas flow is channeled to the regenerator 10. At the entrance to the regenerator 10, a fan 26 is coupled to the regenerator 10 via ducting (not shown). The fan 26 drives ambient air (often called "overfire air") into the entrance of the regenerator 10 to combust fuel remaining in the exhaust gas flow. As an optional feature of this invention, an oxygen flow can be mixed with the air flow driven by the fan 26, into the entrance of the regenerator 10 to combust fuel remaining in the exhaust flow. Alternatively, if the oxygen flow is sufficiently pressurized, the oxygen flow can be used to draw air into an ejector that mixes oxygen and air and injects the air/oxygen mixture into the entrance to the regenerator 10. The oxygen and/or air flow into the regenerator 10 will be referred to as a second oxidant flow hereinafter. Advantageously, the introduction of the second oxidant flow at a temperature preferably above 1500 degrees Farhenheit at the entrance to the regenerator 10 combusts fuel in the exhaust flow to generate heat that is supplied to the regenerator 10 to heat the primary air flow. The combustion of the fuel in the exhaust flow also reduces the emission of fuel pollutants to the atmosphere. If the regenerator 10 is of a type that includes the first and second regenerator units 11, 12, the air flow is supplied to the entrance of the second regenerator unit 12 in FIG. 1. The exhaust gas flow exits the regenerator 10 and can be ducted to a stack or the like for emission to the atmosphere.

The furnace 13 can be of a type in which the direction of gas flow through the furnace 13 is reversed from time to time. In this case, a burner 27 and outlet pipes 28, 29 (shown in broken lines in FIG. 1) are employed in addition to the burner 16 and the outlet pipes 21, 25. The burner 27 and the outlet pipes 28, 29 are counterparts both in structure and function to the burner 16, and outlet pipes 21, 25, respectively, but are positioned such that they act with the direction of the primary air flow and exhaust gas flow reversed relative to that shown in FIG. 1. In other words, in the first operational mode of the furnace 13, the primary air flow and the exhaust gas flow would be as shown in FIG. 1, but in the second operational mode, the primary air flow would be into the second regenerator unit 12, into the port 23 to the burner 27 that generates an exhaust gas flow in the primary burn zone 17 (the primary and secondary burn zones 17, 19 as well as flames 18, 22 are reversed in this case relative to that shown in FIG. 1). In the second operational mode, the exhaust gas flow generated in the furnace 13 exits through the port 14 and is channeled to the first regenerator unit 11 and expelled from the regenerator 10 from a stack or the like. To switch the flow of hydrocarbon fuel from the pump 24 between the outlet pipes 25, 29, a valve 30 coupled by piping to the pump 24 and the pipes 25, 29 can be used. Likewise, to switch the flow of the first oxidant flow from the ejector 20 between the pipes 21, 28, a valve 31 coupled through piping to receive the first oxidant flow from the ejector 20 and having two outlets coupled to the pipes 21, 28, can be used. Further, to switch the second oxidant flow between the first and second regenerator units 11, 12, a valve 32 can be coupled by piping receiving the second oxidant flow. The valve 32 has two outlets coupled by piping or ducting to respective entrances to the first and second regenerator units 11, 12. Of course, valves and piping can be used to switch the hydrocarbon fuel flow between the burners 16, 27.

Figure 3A:
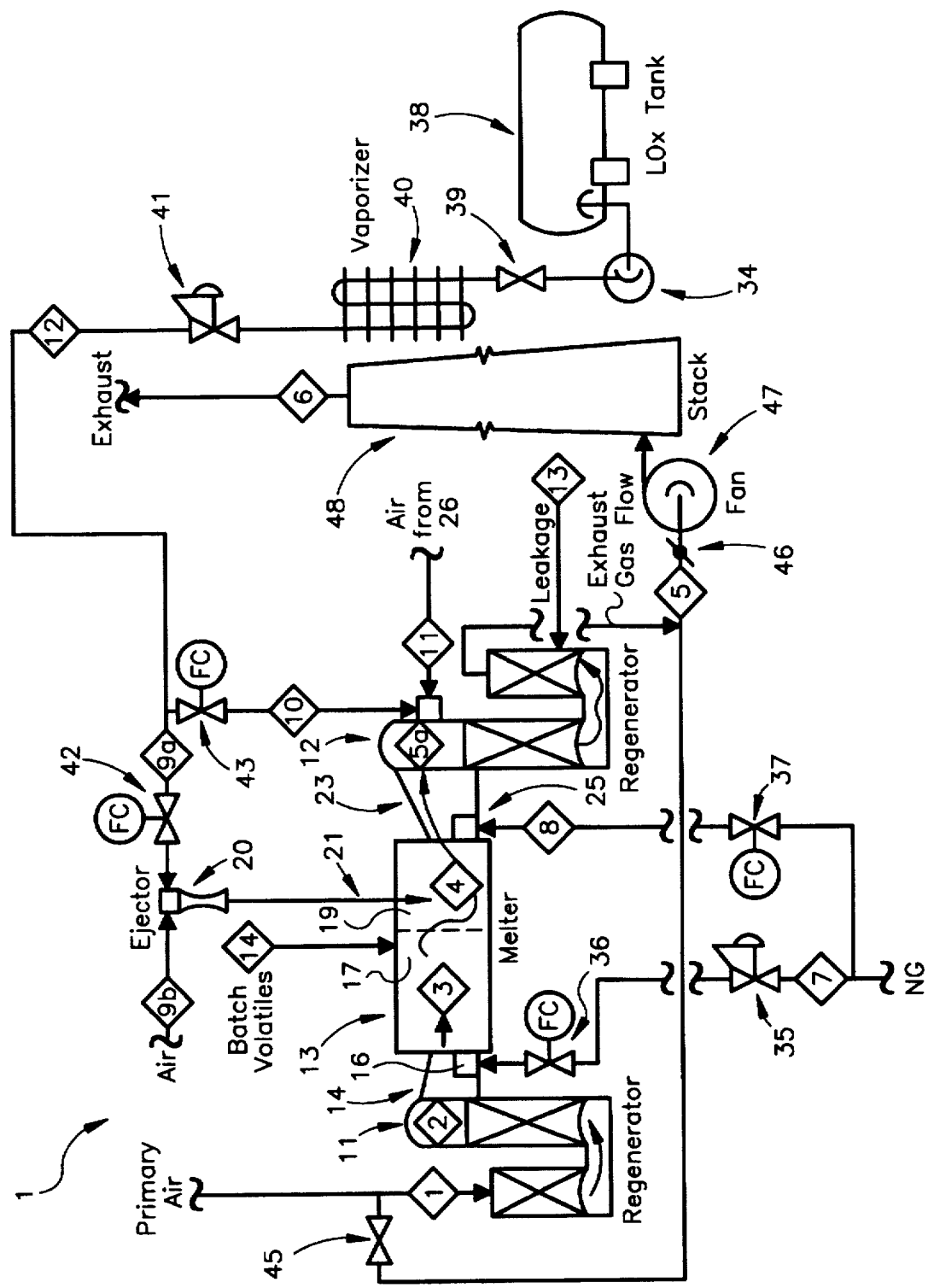
FIG. 3A is a diagram of the system and method of this invention applied to a flat glass, side-port furnace.

FIG. 3A is a diagram of the system and method of this invention applied to a flat glass, side-port furnace. Many of the elements of FIG. 3A have been previously described with respect to FIG. 1. Accordingly, an explanation of these elements is omitted here. In FIG. 3A, the hydrocarbon fuel designated "NG" for Natural Gas, is supplied to a compressor 35 that drives the gaseous hydrocarbon fuel to flow through piping to an inlet of a valve 36. The valve 36 has an outlet coupled to piping to supply the fuel flow to the burner 16. The valve 36 is coupled to receive a respective signal FC from a Flow Controller (not shown). The fuel NG is also supplied to an inlet side of a valve 37 also receiving a respective signal FC. The outlet side of the valve 37 is coupled through piping to the outlet pipe 25 communicating with the outlet port 23 of the system 1.

The oxygen supplied to the ejector 20 for mixing with ambient air, is stored in liquid form designated $LO_x$ in FIG. 3A, in a tank 38. The tank 38 is coupled by piping to an inlet to a pump 34 with an outlet coupled to an inlet to a shut-off valve 39. The pump 34 drives liquid oxygen from the tank 38 to an inlet to the valve 39. The valve 39 has an outlet coupled through piping to a vaporizer 40. The valve 39 can be used to cutoff or allow the liquid oxygen to flow in the piping to the vaporizer 40. The vaporizer 40 heats the oxygen flow in the piping to a temperature sufficient to cause the liquid oxygen to vaporize. The vaporizer 40 is coupled through piping to a compressor 41 that drives the gaseous oxygen to an inlet side of the valve 42 through piping. The valve 42 is electrically coupled to receive a respective signal from the flow controller, and has an outlet coupled through piping to an inlet to the ejector 20. The ejector 20 has another inlet that receives ambient air to be mixed in the ejector 20. The piping from the compressor 41 can also be coupled to an inlet of valve 43 that is electrically coupled to receive a respective signal from the flow controller. The outlet of the valve 43 can be coupled to the entrance of the regenerator 12 and mixed with the air from the fan 26. Alternatively, the air from the fan 26 can be introduced to the regenerator 12 alone without oxygen enrichment if the flow controller is controlled to close the valve 43.

The primary air flow into the first regenerator unit 11 can be cutoff or allowed to flow with a valve 45. A vane 46, coupled by ducting to the first and second regenerator units 11, 12 alternate between two positions to alternate the primary air flow and the exhaust gas flow between the first and second operatonal modes of the system 1. A fan 47 coupled by ducting to the vane 46, drives the exhaust gas flow to a stack 48 for emission into the atmosphere.

The flow controller used to control the valves 36, 37, 42, 43 can be a programmable controller, for example, and preferably controls the valves 36, 37, 42, 43 in a manner to achieve the stoichiometric ratios of the reactants in the system 1 previously described with respect to FIG. 1.

To avoid complication, the burner 27 and the outlet pipes 28, 29 of FIG. 1, the piping and ducting coupled to the first regenerator unit 11 to receive the air flow from the fan 26 and/or oxygen flow from the valve 43, are not shown in FIG. 3A. Also, the the respective valves that can be used to switch respective flows between the burners 16, 27, the pipes 21, 28, the pipes 25, 29, and the air and/or oxygen flow from the fan 26 and the valve 43, respectively, are not shown in FIG. 3A to avoid complication.

FIG. 3B is a table listing descriptions of the conditions of the flows, or streams, at positions indicated by respective numbered diamonds in FIG. 3A. The first gaseous hydrocarbon fuel flow of FIG. 1 is referred to as the "primary fuel" in FIG. 3B, and the second flow of gaseous hydrocarbon fuel in FIG. 1 is referred to as the "reburn fuel" in FIG. 3B. The "primary HP O2" of FIG. 3B refers to the oxygen flow into the ejector 20, described with respect to FIG. 1, and the "primary LP air" refers to the air flow into the ejector 20, described with respect to FIG. 1. The designation "burnout HP O2" refers to the oxygen flow that can optionally be mixed with the air from the fan 26, described with respect to FIG. 1. The designation "burnout LP air" in FIG. 3B refers to the air flow into the entrance of the second regenerator unit 12 in FIG. 1. The "O2" designation refers to the oxygen flow from the vaporizer 40 in FIG. 3A. The "leakage" designation refers to ambient air that leaks into the second regenerator unit 12 of FIG. 1, and the "batch volatile" designation refers to gases emitted from the glass melt in the furnace 13.

In FIG. 3B, the respective conditions of the streams include temperature (T), pressure (P), flow rate (F) in two units, NO generated by the system 1, heat (Q) and stoichiometric ratio (SR) of the reactants in respective streams, or flows, of the system 1.

FIG. 3B also indicates that the emission of $NO_x$ from the system 1 is reduced by 86% by implementing the system and method of this invention. The 86% reduction in $NO_x$ generation is accomplished with a fuel penalty of 7.97% that includes both the gaseous hydrocarbon fuel cost that is used to reduce $NO_x$ and the oxygen cost.

Figure 4A:
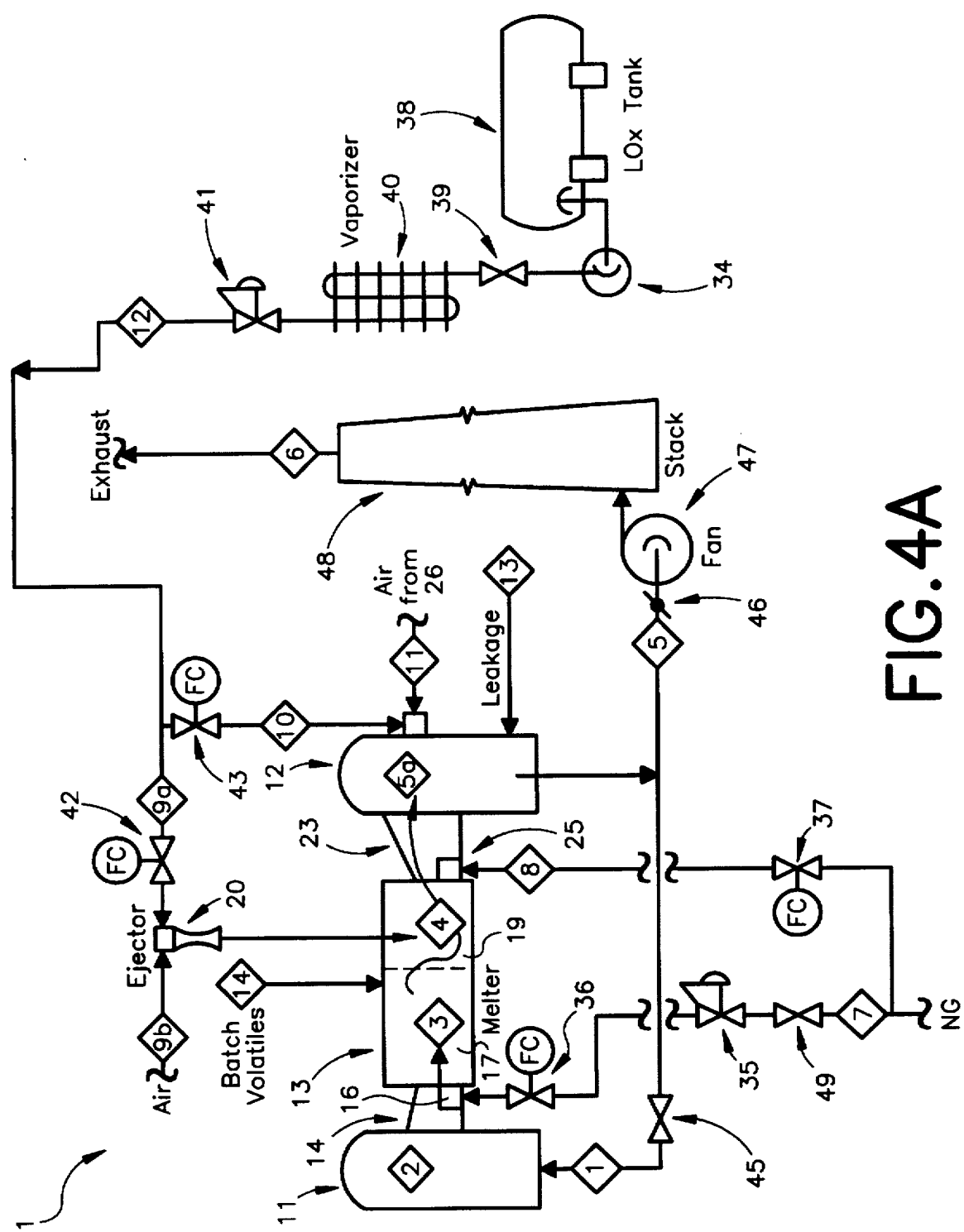
FIG. 4A is a diagram of the system and method of this invention applied to a container glass, side-port furnace.

FIG. 4A is a diagram of the system and method of this invention applied to a container glass, side-port furnace. The numbered elements in FIG. 4A are the same as or similar to those indicated in FIG. 3A. In addition, the piping for the primary fuel flow in FIG. 4A includes a valve 29 to permit or shut-off fuel flow.

FIG. 4B indicates the condition of streams, or equivalently, flows, in the system 1 of FIG. 4A.

Figure 5A:
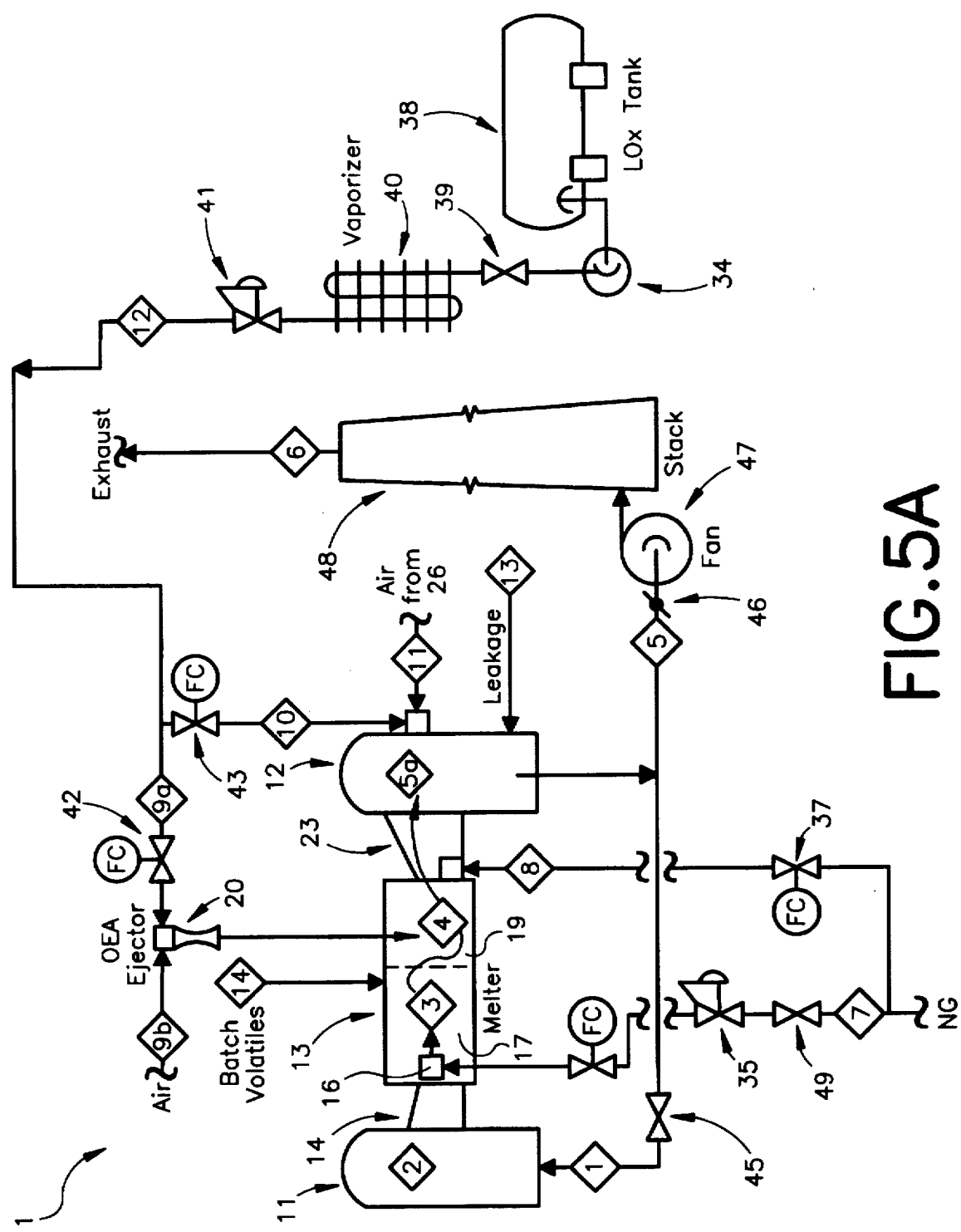
FIG. 5A is a diagram of the system and method of this invention applied to a container glass, end-port furnace.

FIG. 5A is a diagram of the system and method of this invention applied to a container glass, end-port furnace. The numbered elements in FIG. 5A are the same as or similar to those indicated in FIG. 4A.

FIG. 5B indicates the conditions of the flows in the system 1 of FIG. 5A.

Although the invention has been described with specific illustrations and embodiments, it will be clear to those of ordinary skill in the art that various modifications may be made therein without departing from the scope of the invention as outlined in the following claims.

We claim:

1. A method for reducing the emission of $NO_x$ and hydrocarbon fuel from a furnace, the method comprising the steps of:

a) heating a first air flow;
  b) mixing the first air flow with a first flow of hydrocarbon fuel, to produce a flow of a fuel-rich mixture;
  c) combusting the fuel-rich mixture in a first zone of a furnace combustion chamber, to generate heat and an exhaust gas flow;
  d) mixing a second air flow and a first oxygen flow, to produce a first oxidant flow;
  e) injecting the first oxidant flow into the exhaust gas flow in a second zone of the chamber downstream from the first zone relative to the flow direction of the exhaust gas flow, to combust fuel in the exhaust gas flow and thus generate heat in the furnace;
  f) mixing the exhaust gas flow from the chamber with a second flow of hydrocarbon fuel, to produce a reduction reaction to lower the amount of $NO_x$ in the exhaust gas flow; and
  g) mixing a second oxidant flow including at least one of oxygen and air, with the exhaust gas flow from the chamber, to combust fuel in the exhaust gas flow.

2. A method as claimed in claim 1, the method further comprising the step of:

h) after performing said step (g), supplying the exhaust gas flow to a regenerator to transfer heat from the exhaust gas flow to the regenerator.

3. A method as claimed in claim 2, wherein the heat transferred to the regenerator in said step (h) is used to heat the air flow in said step (a).

4. A method as claimed in claim 1, further comprising the step of:

h) producing molten glass with the heat generated in said steps (c) and (e).

5. A method as claimed in claim 1, wherein said fuel-rich mixture mixed in said step (b) has a stoichiometric ratio in a range from 0.95 to 0.99.

6. A method as claimed in claim 1, wherein the injecting in said step (e) is performed so that the proportion of the exhaust gas flow and the first oxidant flow produces an oxidizer-rich gaseous mixture with a stoichiometric ratio of slightly greater than approximately 1.0.

7. A method as claimed in claim 1, wherein the mixing in said step (f) of the second flow of hydrocarbon fuel and the exhaust gas flow produces a fuel-rich mixture with a stoichiometric ratio of about 0.92.

8. A method as claimed in claim 1, wherein the mixing of the second oxidant flow and the exhaust gas flow in said step (g) produces an oxidizer-rich mixture with a stoichiometric ratio sufficient to complete the hydrocarbon fuel combustion so that the exhaust gas flow has less than 500 parts per million of uncombusted hydrocarbon fuel.

9. A method as claimed in claim 1, wherein the mixing of said step (f) is performed in an outlet port from the chamber.

10. A method as claimed in claim 9, wherein the mixing in said step (g) is performed in proximity to an entrance of a regenerator.

11. A method as claimed in claim 10, wherein the regenerator is used to heat the first air flow in said step (a).

12. A method as claimed in claim 1, wherein a regenerator includes first and second regenerator units and the method further comprises the step of:

h) alternating the respective flow directions of the first air flow and the exhaust gas flow between a first operational mode in which the first regenerator unit heats the first air flow in said step (a) as the second regenerator unit receives and is heated by the exhaust gas flow, and a second operational mode in which the second regenerator unit heats the first air flow in said step (a) and the first regenerator unit receives and is heated by the exhaust gas flow.

13. A method as claimed in claim 1, wherein the first zone of the furnace combustion chamber includes about two-thirds of the volume of the furnace combustion chamber, and the second zone of the furnace combustion chamber includes approximately the remaining one-third of the volume of the combustion chamber.

14. A method as claimed in claim 13, wherein the second zone has a first side adjacent the first zone and a second side adjacent an outlet port, the injecting of the first oxidant flow in said step (e) being performed approximately at the first side of the second zone.

15. A method as claimed in claim 1, wherein said step (g) is performed after said step (f).

16. A method applied to a regenerative-type high-temperature furnace combustion chamber including a primary burn zone in which a relatively large flow of hydrocarbon fuel is combusted, and a secondary burn zone receiving an exhaust gas flow from the primary burn zone, the method comprising the steps of:

a) injecting a first oxidant flow including at least one of oxygen and air, into the exhaust gas flow in the secondary burn zone to generate heat in the furnace;

b) mixing the exhaust gas flow from the chamber with a second flow of gaseous hydrocarbon fuel, to produce a reduction reaction to lower the amount of $NO_x$ in the exhaust gas flow; and c) mixing a second oxidant flow including at least one of oxygen and air, with the exhaust gas flow, to combust fuel in the exhaust gas flow.

* * * * *

UNITED STATES PATENT AND TRADEMARK OFFICE
CERTIFICATE OF CORRECTION

PATENT NO. : 5,759,022

DATED : June 2, 1998

INVENTOR(S) : Koppang, et al.

It is certified that error appears in the above-identified patent and that said Letters Patent is hereby corrected as shown below:

On the title page, item [54] and column 1;
In the title, after "Method" delete "and System".

Abstract
In Item [57], delete the last sentence.

Signed and Sealed this

Ninth Day of February, 1999

Attest:

*Attesting Officer*

*Acting Commissioner of Patents and Trademarks*